United States Patent [19]
Miyoshi

[11] Patent Number: 5,808,928
[45] Date of Patent: Sep. 15, 1998

[54] ARITHMETIC PROCESSING APPARATUS

[75] Inventor: Akira Miyoshi, Osaka, Japan

[73] Assignee: Matsushita Electric Industrial Co., Ltd., Osaka, Japan

[21] Appl. No.: 866,251

[22] Filed: Jun. 5, 1997

[30] Foreign Application Priority Data

Jun. 6, 1996 [JP] Japan ................................. 8-144050

[51] Int. Cl.$^6$ ................................. G06F 7/50; G06F 7/52
[52] U.S. Cl. ................................. 364/760.01; 364/760.02
[58] Field of Search ................................. 364/760, 784, 364/787, 786

[56] References Cited

U.S. PATENT DOCUMENTS

| 4,228,520 | 10/1980 | Letteney et al. | 364/760 |
| 4,644,491 | 2/1987 | Ookawa et al. | 364/784 |
| 4,819,198 | 4/1989 | Noll et al. | 364/787 |
| 4,879,677 | 11/1989 | Shiraishi | 364/760 |
| 5,220,525 | 6/1993 | Anderson et al. | 364/760 |
| 5,699,279 | 5/1996 | Widigen et al. | 364/786 |

FOREIGN PATENT DOCUMENTS

| 0 295 621 | 12/1988 | European Pat. Off. . |
| 58-56033 | 4/1983 | Japan . |
| 5-119969 | 5/1993 | Japan . |

OTHER PUBLICATIONS

Liu et al., "Multiplication Using 2's Complement Numbers", IBM Technical Disclosure Bulletin, vol. 9, No. 2, Jul. 1966, pp. 171–173.

M.R. Santoro et al., "SPIM: A Pipelined 64×64–bit Iterative Multiplier", IEEE Journal of Solid–State Circuits, vol. 24, No. 2, pp. 487–493, Apr. 1989.

*Primary Examiner*—Ayaz R. Sheikh
*Assistant Examiner*—Omar A. Omar
*Attorney, Agent, or Firm*—McDermott, Will & Emery

[57] ABSTRACT

A partial product adder for summing up four partial products P0, P1, P2, and P3 which are binary numbers in twos-complement representation having different weights is composed of a carry save adder consisting of an array of 4:2 compressors each having four inputs. Of the four inputs of each 4:2 compressor, the input W presents the shortest propagation delay, while the inputs Y and Z compose critical paths. To implement sign extension of the first partial product P0 having the smallest weight, a logic circuit provides, in a plurality of digit positions higher than the sign digit P0s of the first partial product, values resulting from a logic operation between the value of the sign digit P0s of the first partial product and the value of the sign digit P1s of the second partial product having the second smallest weight. The first partial product P0 after sign extension is allocated to the input W of the carry save adder, while the plurality of upper digits of the input Z related to the second partial product P1 have their values fixed to 0. This reduces a time penalty accompanying the sign extension.

10 Claims, 8 Drawing Sheets

ARITHMETIC PROCESSING APPARATUS

BACKGROUND OF THE INVENTION

The present invention relates to an arithmetic processing apparatus having a multiplying function and, more particularly, to a multiplier.

A parallel multiplier calculates a product by summing up a plurality of partial products generated in parallel from a multiplier factor and a multiplicand. The number of the partial products can be reduced based on the Booth's algorithm.

As discussed in "SPIM: A Pipelined 64×64-bit Iterative Multiplier" (M. R. Santoro et al., IEEE Journal of Solid-State Circuits, Vol. 24, No. 2, pp.487–493, April 1989), 4:2 compressors capable of constructing a binary tree are suitable for the summation of the partial products. A carry save adder composed of an array of numerous 4:2 compressors is used to sum up the partial products, in which each 4:2 compressor consists of two 3-input 2-output full adders.

The individual partial products have different weights. If the partial products are binary numbers in twos-complement representation, therefore, it is necessary to implement sign extension of the partial products prior to performing carry save addition with respect to the partial products. By way of example, consideration will be given to the case where four partial products P0, P1, P2, and P3 generated in accordance with the second-degree Booth's algorithm are summed. It is assumed here that the four partial products P0, P1, P2, and P3, each composed of nine digits, have respective weights of $2^0$, $2^2$, $2^4$, and $2^6$. The most significant digit of each of the partial products is a sign digit. In this case, it is necessary to implement sign extension of each of the three partial products P0, P1, and P2 except the partial product having the largest weight (most significant partial product) P3. Specifically, six additional digits each having the value of the sign digit of the partial product having the smallest weight (first partial product) P0 are provided in digit positions higher than the sign digit of the first partial product P0, thereby achieving sign extension of the first partial product P0. Four additional digits each having the value of the sign digit of the partial product with the second smallest weight (second partial product) P1 are provided in digit positions higher than the sign digit of the second partial product P1, thereby achieving sign extension of the second partial product P1. Two additional digits each having the value of the sign digit of the partial product with the third smallest weight (third partial product) P2 are provided in digit positions higher than the sign digit of the third partial product P2, thereby achieving sign extension of the third partial product P2. Carry save addition is performed with respect to the individual corresponding digits of the four partial products P0, P1, P2, and P3 after sign extension.

As indicated by its name, the 4:2 compressor has four inputs and two outputs. One of the four inputs reaches the two outputs of the 4:2 compressor by passing through only one of the two full adders, while the other three inputs reach the two outputs of the 4:2 compressor by sequentially passing through the two full adders. As a result, any of the other three inputs forms a critical path presenting the longest propagation delay in the carry save adder. However, in the case of implementing sign extension of all the partial products except the most significant partial product as described above, the input composing the critical path is dependent on the value of the sign digit of any partial product, which causes a time penalty.

SUMMARY OF THE INVENTION

It is therefore an object of the present invention to reduce the time penalty accompanying the sign extension during the summation of the partial products.

To attain the object, the present invention allocates a specified partial product after sign extension implemented based on a plurality of sign digits to a specified input not composing the critical path in the carry save adder, thereby fixing the input composing the critical path in the carry save adder to a constant value.

Specifically, an arithmetic processing apparatus or a multiplier according to the present invention comprises a partial product adder for summing up a plurality of partial products which are binary numbers in twos-complement representation having different weights, wherein the partial product adder comprises a carry save adder having a plurality of inputs and at least one output for performing carry save addition with respect to the plurality of partial products and a logic circuit for providing, in a plurality of digit positions higher than the sign digit of the partial product having the smallest weight (first partial product) of the plurality of partial products, values resulting from a plurality of logic operations between the value of the sign digit of the first partial product and the value of the sign digit of another partial product. In the carry save adder, the specified input presents propagation delay between the output and itself, which is shorter than propagation delay presented by at least one other input. The first partial product after sign extension implemented by the logic circuit is allocated to the specific input.

BRIEF DESCRIPTION OF THE DRAWINGS

FIG. 4 is a circuit diagram showing the internal structure of a full adder in FIG. 4;

DETAILED DESCRIPTION OF THE INVENTION

Referring now to the drawings, a specific embodiment of a multiplier as a type of arithmetic processing apparatus according to the present invention will be described.

Figure 1:
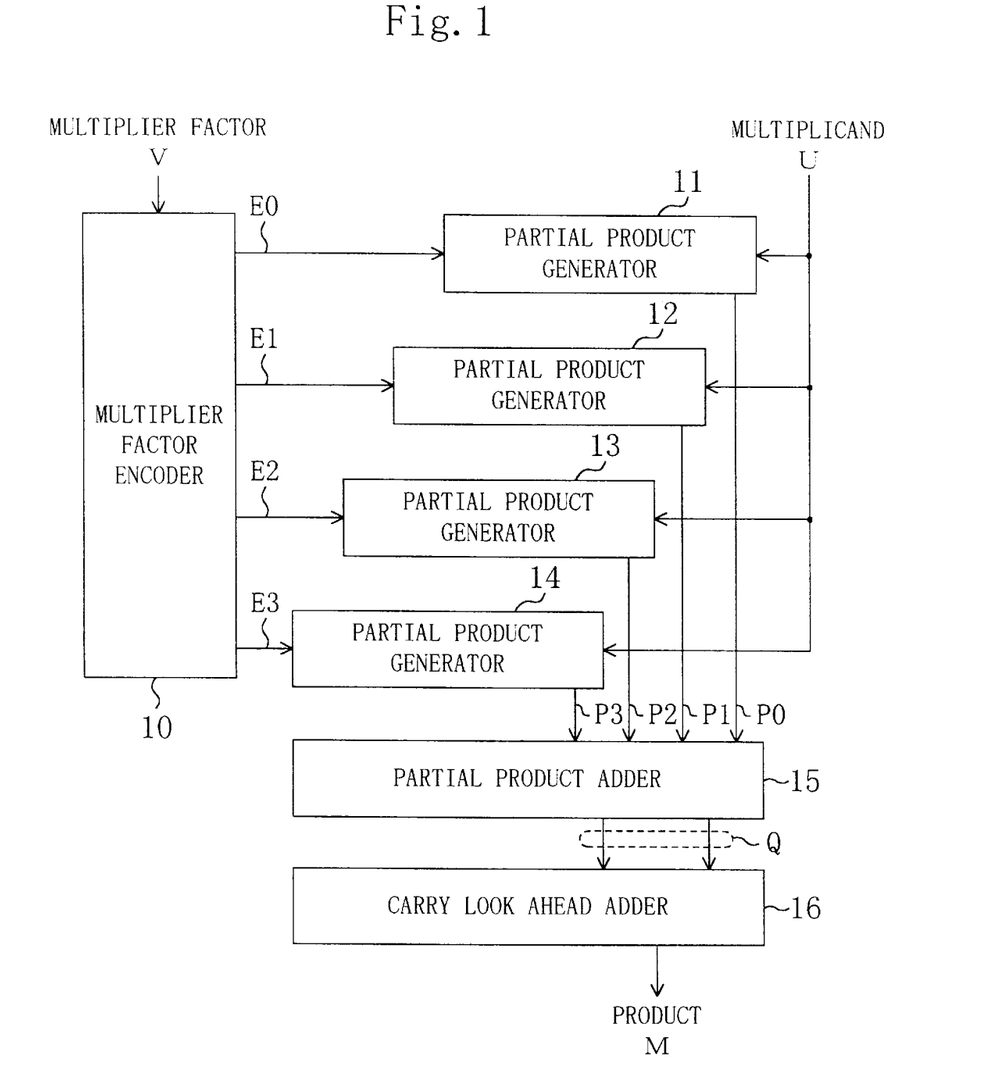
FIG. 1 is a block diagram showing a specific embodiment of a multiplier according to the present invention.

FIG. 1 shows a specific example of the structure of the multiplier according to the present invention, which comprises: a multiplier factor encoder 10; four partial product generators 11, 12, 13, and 14; a partial product adder 15; and a carry look ahead adder 16 to calculate the product M of a multiplicand U and a multiplier factor V, each of which is an 8-digit binary number in twos-complement representation. The multiplier factor encoder 10 generates four encoded values E0, E1, E2, and E3 from the multiplier factor V in accordance with the second-degree Booth's algorithm. The four partial product generators 11, 12, 13, and 14 generate in parallel four partial products P0, P1, P2, and P3, which are binary numbers in twos-complement representation having different weights, from the multiplicand U and the four encoded values E0, E1, E2, and E3. The four partial products P0, P1, P2, and P3, each composed of nine digits, have respective weights of $2^0$, $2^2$, $2^4$, and $2^6$. The most significant digit of each of the partial products is a sign digit. The partial product adder 15 performs carry save addition with respective to the individual corresponding digits of the four partial products P0, P1, P2, and P3 and supplies the result of addition (composed of two binary numbers) Q to the carry look ahead adder 16. The carry look ahead adder 16 calculates the product M from the result of addition Q supplied from the partial product adder 15.

Figure 2:
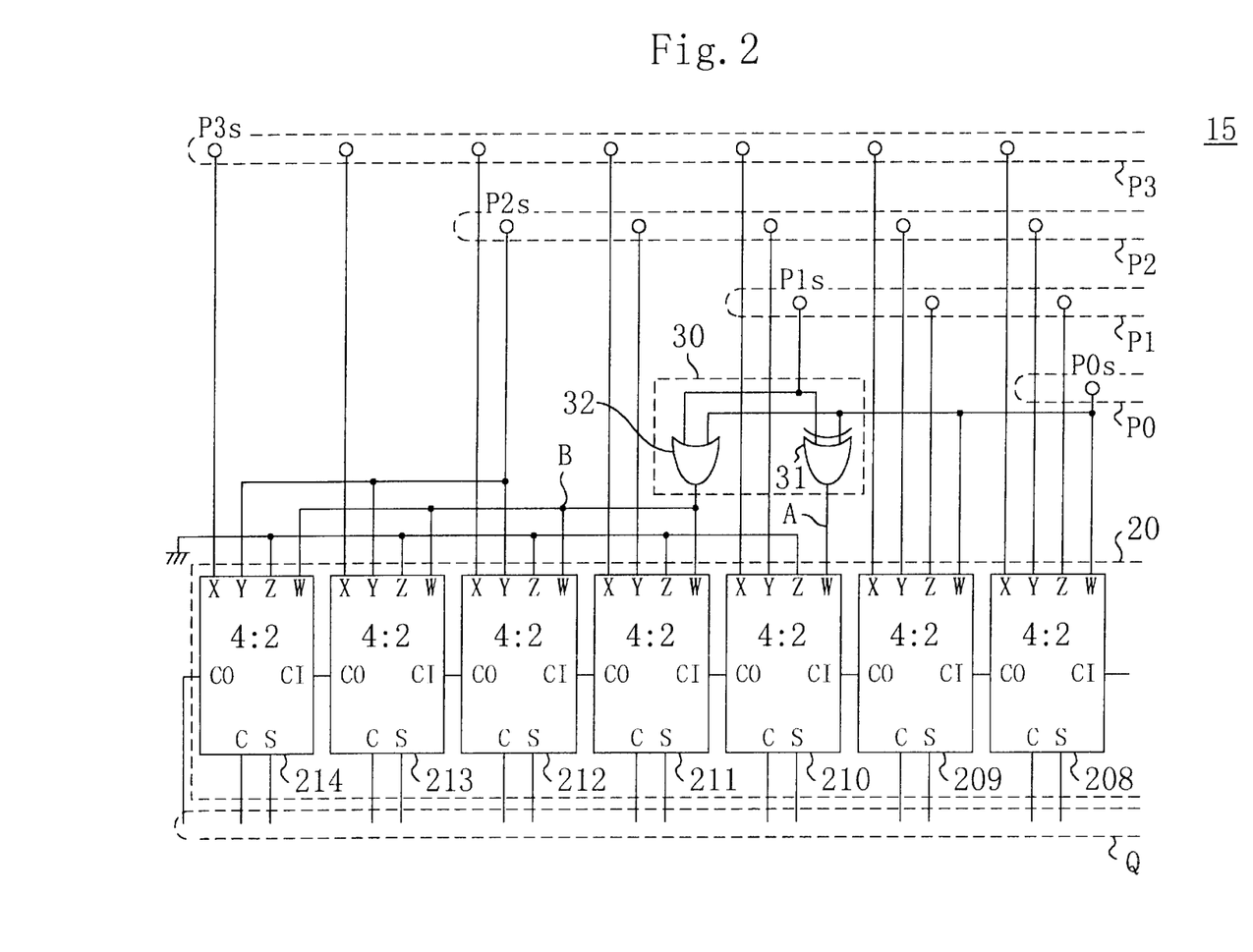
FIG. 2 is a block diagram showing a part of the internal structure of a partial product adder in FIG. 1.
Figure 3:
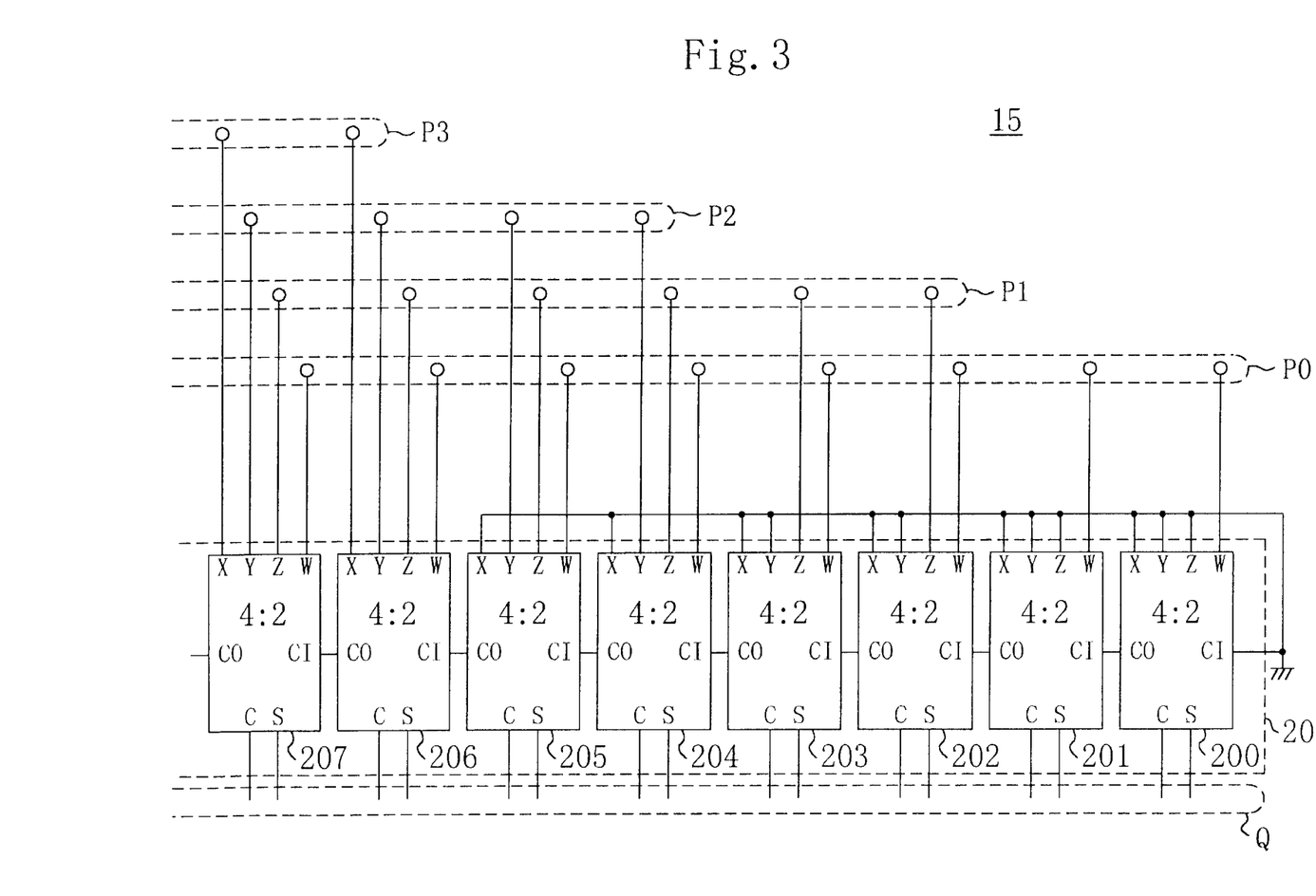
FIG. 3 is a block diagram showing another part of the internal structure of the partial product adder in FIG. 1.

FIGS. 2 and 3 show the internal structure of the partial product adder 15 in FIG. 1. In the drawings are shown: a carry save adder 20 consisting of fifteen 4:2 compressors 200 to 214; and a logic circuit 30 composed of an EXCLUSIVE-OR gate 31 and an OR gate 32. Each of the fifteen 4:2 compressors 200 to 214 actually has five inputs X, Y, Z, W, and CI and three outputs C, S, and CO, of which CI is a carry input from the lower digit, CO is a carry output to the upper digit, C is a carry output to the carry look ahead adder 16, and S is a sum output to the carry look ahead adder 16. The four partial products P0, P1, P2, and P3 are allocated to the inputs W, Z, Y, and X of the carry save adder 20, respectively. In FIG. 2, P0s, P1s, P2s, and P3s represent the respective sign digits of the partial product having the smallest weight (first partial product) P0, the partial product having the second smallest weight (second partial product) P1, the partial product having the third smallest weight (third partial product) P2, and the partial product having the largest weight (most significant partial product) P3.

As shown in FIG. 2, sign extension of the first partial product P0 is implemented in the following process. A digit having the value of the sign digit P0s of the first partial product is provided in the digit position (with the weight of $2^9$) one digit higher than the sign digit P0s of the first partial product. In the digit position (with the weight of $2^{10}$) of the first partial product P0 corresponding to the sign digit P1s of the second partial product, there is provided the exclusive OR value A between the respective sign digits P0s and P1s of the first and second partial products obtained by the EXCLUSIVE-OR gate 31. In the digit positions of the first partial product P0 extending from the one (with the weight of $2^{11}$) corresponding to the digit position one digit higher than the sign digit P1s of the second partial product to the one (with the weight of $2^{14}$) corresponding to the sign digit P3s of the most significant partial product, there are provided the OR values B between the values of the respective sign digits P0s and P1s of the first and second partial products obtained by the OR gate 32. Hence, A=P0s∧P1s B=P0s+P1s are satisfied, where z,1 represents the exclusive OR value and + represents the OR value.

The sign digit (with the weight of $2^{10}$) of the second partial product P1 and the four digits (with the weights of $2^{11}$ to $2^{14}$) higher than the sign digit of the second partial product P1 have their values fixed to 0. Each of the two digits (with the weights of $2^{13}$ to $2^{14}$) higher than the sign digit P2s of the third partial product P2 has the value of the sign digit P2s of the third partial product.

If the first and second partial products P0 and P1 are subjected to sign extension according to the conventional embodiment, the summation of the respective five digits with the weights of $2^{10}$ to $2^{14}$ of the first and second partial products P0 and P1 can be expressed as 00000+00000=00000 (when P0s=0 and P1s=0)

11111+00000=11111 (when P0s=1 and P1s=0)

00000+11111=11111 (when P0s=0 and P1s=1)

11111+11111=11110 (when P0s=1 and P1s=1).

Briefly, with the values of the five digits (with the weights of $2^{10}$ to $2^{14}$) of the first partial product P0 thus determined by the logic circuit 30, the values of the five digits (with the weights of $2^{10}$ to $2^{14}$) of the second partial product P1 can be fixed to 0.

Figure 4:
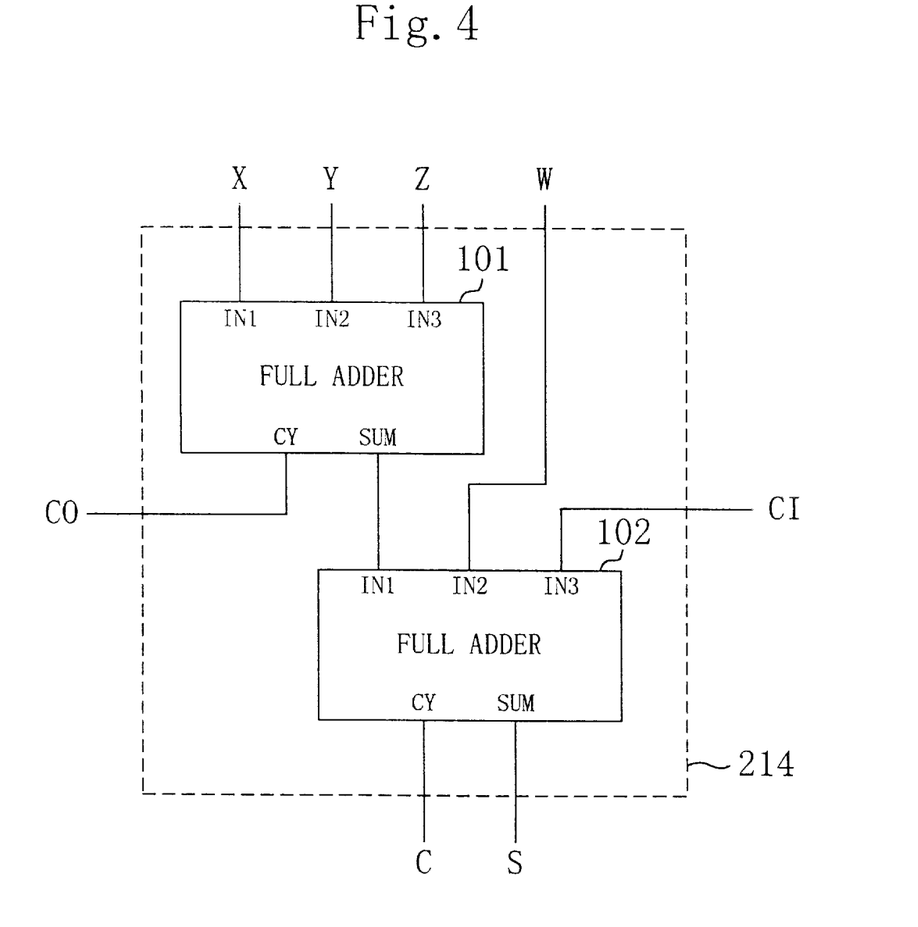
FIG. 4 is a block diagram showing the internal structure of a 4:2 compressor in FIGS. 2 and 3.

FIG. 4 shows the internal structure of a 4:2 compressor 214 consisting of first and second full adders 101 and 102. Each of the first and second full adders 101 and 102 has three inputs IN1, IN2, and IN3 and two outputs CY (carry) and SUM (sum). The inputs X, Y, and Z of the 4:2 compressor 214 are allocated to the inputs IN1, IN2, and IN3 of the first full adder 101, respectively. The input W of the 4:2 compressor 214 is allocated to the input IN2 of the second full adder 102. The output SUM from the first full adder 101 is given to the input IN1 of the second full adder 102, while the carry input CI from the lower digit is given to the input IN3 of the second full adder 102. The carry output CO is supplied from the first full adder 101 to the higher digit, while the outputs C and S are supplied from the second full adder 102 to the carry look ahead adder 16. The internal structure of each of the other fourteen 4:2 compressors 200 to 213 shown in FIGS. 2 and 3 is the same as shown in FIG. 4.

Figure 5:
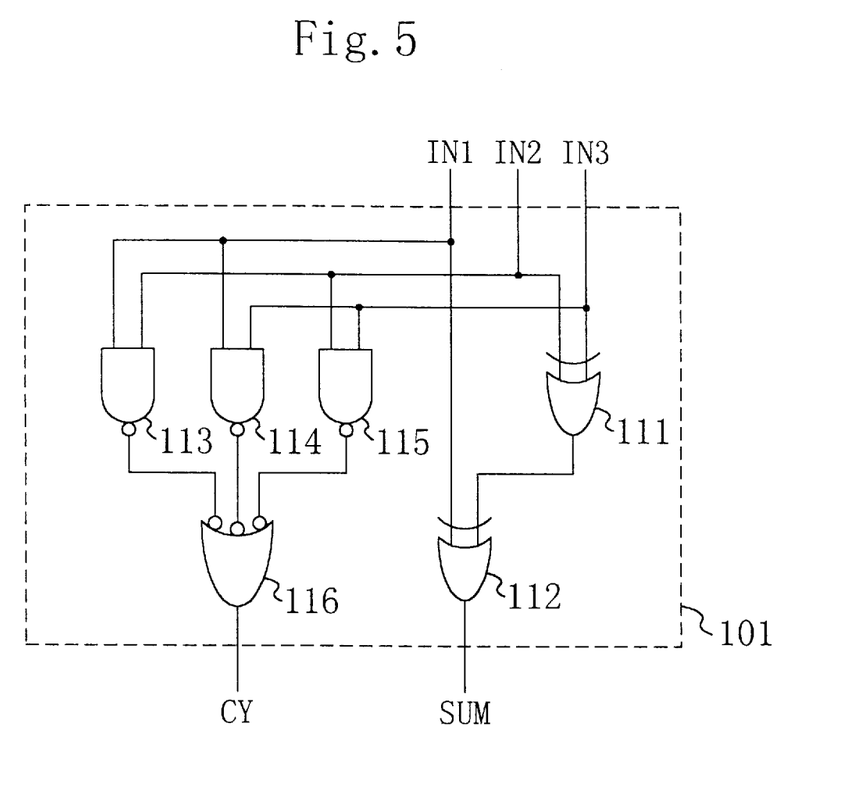

FIG. 5 shows the internal structure of the first full adder 101 consisting of two EXCLUSIVE-OR gates 111 and 112, three 2-input NAND gates 113, 114, and 115, and one 3-input NAND gate 116. The internal structure of the second full adder 102 shown in FIG. 4 is the same as shown in FIG. 5.

As shown in FIGS. 4 and 5, the input W to the 4:2 compressor 214 passes through only the second full adder 102, i.e., through at most two gates to reach the outputs C and S of the 4:2 compressor 214, while the input X to the 4:2 compressor 214 passes through at most three gates in the first and second full adders 101 and 102 to reach the output C of the 4:2 compressor 214. On the other hand, each of the inputs Y and Z to the 4:2 compressor 214 passes through at most four gates in the first and second full adders 101 and 102 to reach the output C of the 4:2 compressor 214. In other words, the input W presents the shortest propagation delay, while the inputs Y and Z compose critical paths in the carry save adder 20, respectively. Therefore, as described above, the first, second, third, and fourth partial products P0, P1, P2, and P3 are allocated to the inputs W, Z, Y, and X, respectively.

Figure 6:
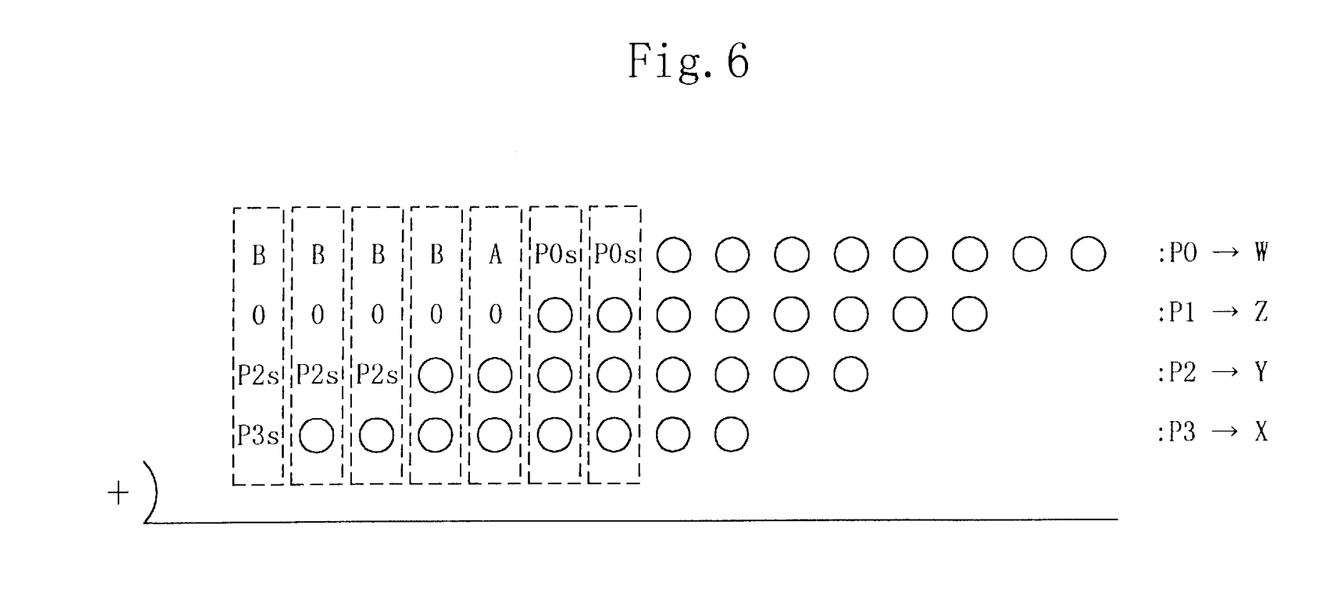
FIG. 6 illustrates the operation of a partial product adder having the structure shown in FIGS. 2 and 3.

FIG. 6 conceptually illustrates the sign extension and allocation of the four partial products P0, P1, P2, and P3. Since each of the five most significant digits of the input Z composing the critical path is fixed to the constant value of 0, the time penalty accompanying the sign extension is reduced, which contributes to the execution of high-speed multiplication. Moreover, since each of the exclusive OR value A and OR value B is generated by one gate in the logic circuit 30 with the first partial product P0 allocated to the input W, propagation delay in the logic circuit 30 will not increase propagation delay in the partial product adder 15.

The four partial products P0, P1, P2, and P3 may also be allocated to the inputs X, Y, Z, and W of the carry save adder 20, respectively. In this case, the five most significant digits of the input Y composing the critical path are fixed to the constant value of 0, so that the time penalty accompanying sign extension is similarly reduced. Moreover, since the first partial product P0 having input delay comparable to that in one gate is allocated to the input X, propagation delay in the logic circuit 30 will not increase propagation delay in the partial product adder 15.

Figure 7:
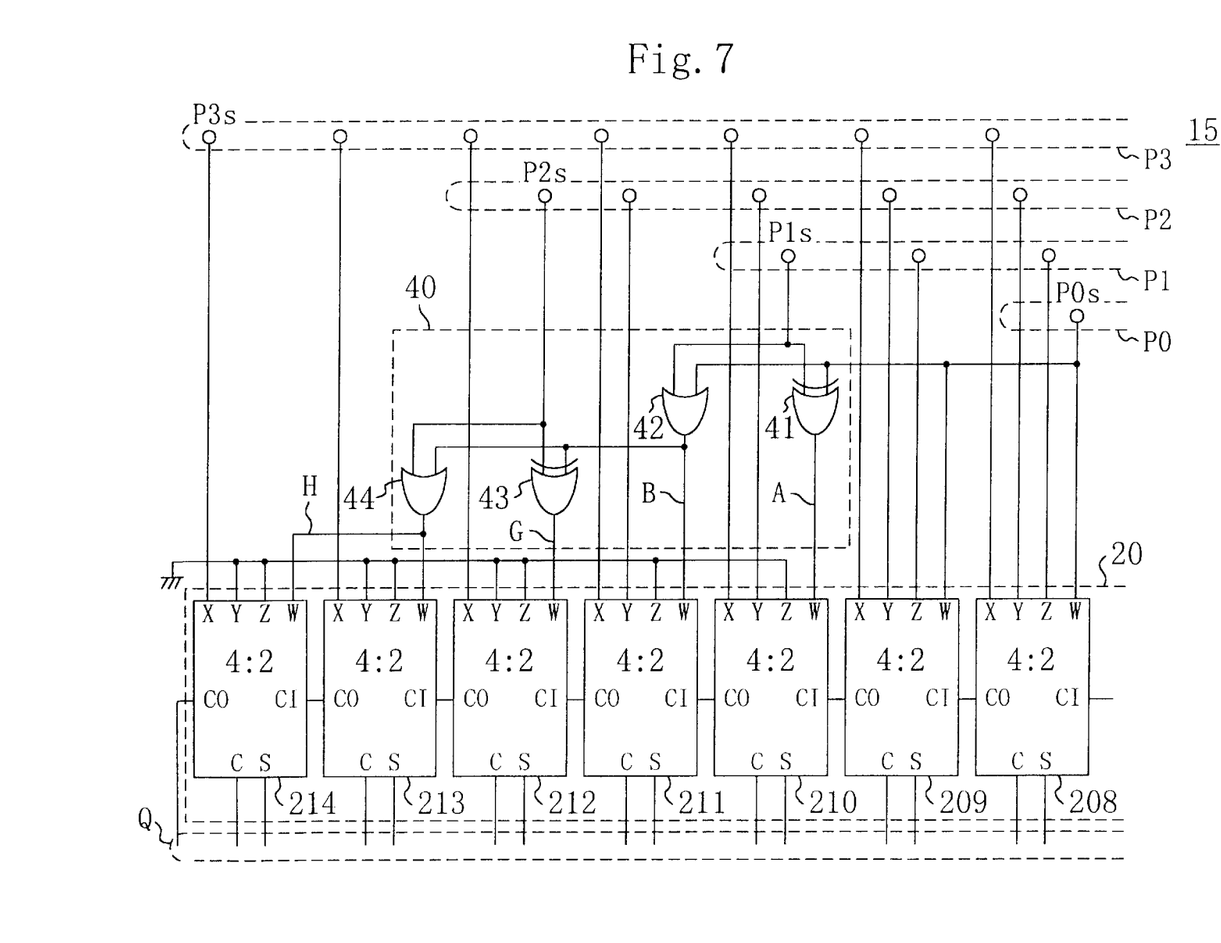
FIG. 7 is a block diagram showing a variation of the partial product adder shown in FIG. 2.

FIG. 7 shows a variation of the partial product adder shown in FIG. 2. In the variation, not only the five most significant digits of the input Z to the carry save adder 20 but also the three most significant digits of the input Y thereto are also fixed to the constant value of 0. A logic circuit 40 shown in the drawing consists of two EXCLUSIVE-OR gates 41 and 43 and two OR gates 42 and 44. Similarly to FIG. 2, the four partial products P0, P1, P2, and P3 are allocated to the inputs W, Z, Y, and X of the carry save adder 20, respectively.

As shown in FIG. 7, sign extension of the first partial product P0 is implemented in the following process. A digit having the value of the sign digit P0s of the first partial product is provided in the digit position (with the weight of $2^9$) one digit higher than the sign digit P0s of the first partial product. In the digit position (with the weight of $2^{10}$) of the first partial product P0 corresponding to the sign digit P1s of the second partial product, there is provided the exclusive OR value A between the respective sign digits P0s and P1s of the first and second partial products obtained by the EXCLUSIVE-OR gate 41. In the digit position (with the weight of $2^{11}$) of the first partial product P0 corresponding to the digit position one digit higher than the sign digit P1s of the second partial product, there is provided the OR value B between the values of the respective sign digits P0s and P1s of the first and second partial products obtained by the OR gate 42. In the digit position (with the weight of $2^{12}$) of the first partial product P0 corresponding to the sign digit P2s of the third partial product, there is provided the exclusive OR value G between the OR value B and the value of the sign digit P2s of the third partial product obtained by the EXCLUSIVE-OR gate 43. In the digit positions of the first partial product P0 extending from the one (with the weight of $2^{13}$) corresponding to the digit position one digit higher than the sign digit P2s of the third partial product to the one (with the weight of $2^{14}$) corresponding to the sign digit P3s of the most significant partial product, there are provided the OR values H between the OR value B and the value of the sign digit P2s of the third partial product obtained by the OR gate 44. Hence, A=P0s∧P1s
B=P0s+P1s
G=B∧P2s
H=B+P2s are satisfied, where ∧ represents the exclusive OR value and + represents the OR value.

The sign digit (with the weight of $2^{10}$) of the second partial product P1 and the four digits (with the weights of $2^{11}$ to $2^{14}$) higher than the sign digit of the second partial product P1 have their values fixed to 0. The sign digit (with the weight of $2^{12}$) of the third partial product P2 and the two digits (with the weights of $2^{13}$ and $2^{14}$) higher than the sign digit of the third partial product P2 also have their values fixed to 0.

Figure 8:
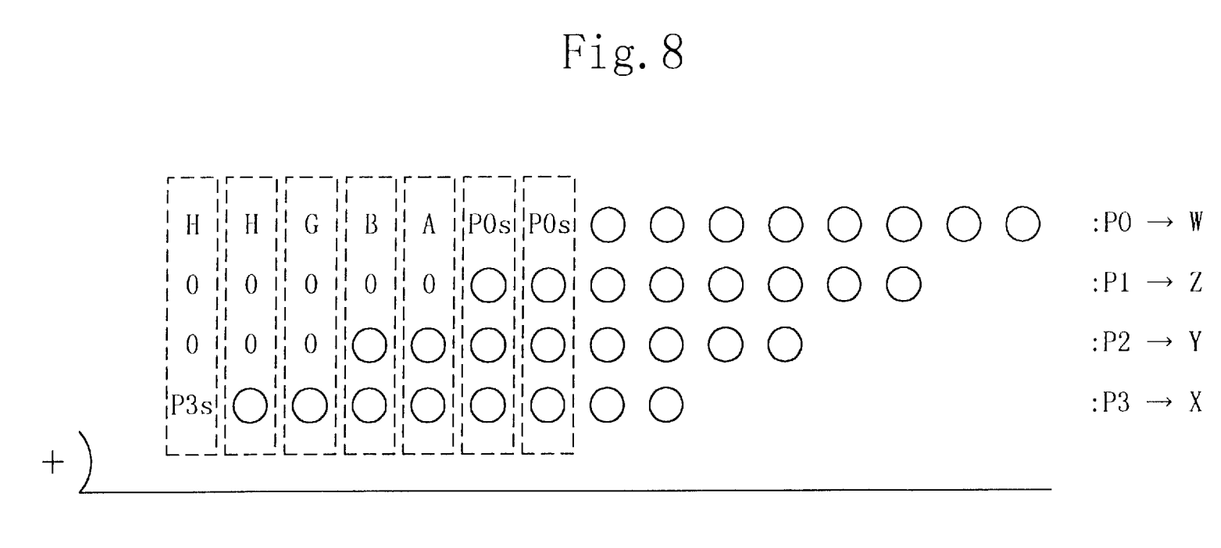
FIG. 8 illustrates the operation of a partial product adder having the structure shown in FIG. 7.

FIG. 8 conceptually illustrates the sign extension and allocation of the four partial products P0, P1, P2, and P3. Since the respective upper digits of the inputs Y and Z composing the critical paths are fixed to the constant value of 0 independent of the value of the sign digit of any partial product, the time penalty accompanying the sign extension is further reduced, which contributes to the execution of high-speed multiplication. Moreover, since each of the exclusive OR values A and G and OR values B and H is generated by at most two gates in the logic circuit 40 with the first partial product P0 allocated to the input W, propagation delay in the logic circuit 40 will not increase propagation delay in the partial product adder 15.

Although each of the foregoing specific embodiments has used the multiplier comprising the carry save adder consisting of the plurality of 4:2 compressors, the present invention is generally applicable to a multiplier comprising a carry save adder in which a specific one of a plurality of inputs presents propagation delay shorter than propagation delay in at least one other input. In a multiplier composed of 16×16 digits, e.g., the present invention is applicable to the summation of partial products in a carry save adder consisting of an array of 7:3 compressors. The algorithm used in the multiplier factor encoder is not limited to the second-degree Booth's algorithm but a higher-degree Booth's algorithm may also be used instead.

I claim:

1. An arithmetic processing apparatus having a partial product adder for summing up a plurality of partial products which are binary numbers in twos-complement representation having different weights, wherein said partial product adder comprises:

a carry save adder having a plurality of inputs and at least one output for performing carry save addition with respect to said plurality of partial products; and a logic circuit for providing, in a plurality of digit positions higher than a sign digit of the partial product having the smallest value (first partial product) of said plurality of partial products, values resulting from a plurality of logic operations between a value of the sign digit of said first partial product and a value of a sign digit of another partial product to implement sign extension of said first partial product and a specified one of said plurality of inputs of said carry save adder presents propagation delay shorter than propagation delay of at least one other input between said output and itself and said first partial product after sign extension implemented by said logic circuit is allocated to said specified input.

2. An arithmetic processing apparatus according to claim 1, wherein said first partial product after sign extension implemented by said logic circuit is allocated to the one of said plurality of inputs presenting the shortest propagation delay between said output and itself.

3. An arithmetic processing apparatus according to claim 1, wherein said logic circuit has the function of determining respective values of digits of said first partial product extending from the one one digit higher than said sign digit to the one corresponding in position to a sign digit of the partial product having the largest weight (most significant partial product) of said plurality of partial products.

4. An arithmetic processing apparatus according to claim 3, wherein said logic circuit has the function of:

providing the value of the sign digit of said first partial product in each of the digit positions of said first partial product extending from the one one digit higher than the sign digit of said first partial product to the one corresponding to the digit position one digit lower than a sign digit of the partial product having the second smallest weight (second partial product) of said plurality of partial products;

providing an exclusive OR value between the value of the sign digit of said first partial product and the value of the sign digit of said second partial product in the digit position of said first partial product corresponding to the sign digit of said second partial product; and providing an OR value between the value of the sign digit of said first partial product and the value of the sign digit of said second partial product in each of the digit positions of said first partial product extending from the one corresponding to the digit position one digit higher than the sign digit of said second partial product to the one corresponding to the sign digit of said most significant partial product.

5. An arithmetic processing apparatus according to claim 3, wherein said logic circuit has the function of:

providing the value of the sign digit of said first partial product in each of the digit positions of said first partial product extending from the one one digit higher than the sign digit of said first partial product to the one corresponding to the digit position one digit lower than a sign digit of the partial product having the second smallest weight (second partial product) of said plurality of partial products;

providing an exclusive OR value between the value of the sign digit of said first partial product and the value of the sign digit of said second partial product in the digit position of said first partial product corresponding to the sign digit of said second partial product;

providing an OR value between the value of the sign digit of said first partial product and the value of the sign digit of said second partial product in each of the digit positions of said first partial product corresponding to the digit position one digit higher than the sign digit of said second partial product to the one corresponding to the digit position one digit lower than a sign digit of the partial product having the third smallest weight (third partial product) of said plurality of partial products;

providing an exclusive OR value between said OR value and the value of the sign digit of said third partial product in the digit position of said first partial product corresponding the sign digit of said third partial product; and providing an OR value between said OR value and the value of the sign digit of said third partial product in each of the digit positions of said first partial product extending from the one corresponding to the digit position one digit higher than the sign digit of said third partial product to the one corresponding to the sign digit of said most significant partial product.

6. A multiplier for calculating a product of a multiplier factor and a multiplicand each of which is a binary number in twos-complement representation, said multiplier comprising:

a multiplier factor encoder for generating a plurality of encoded values from said multiplier factor;

a plurality of partial product generators for generating, from said multiplicand and said plurality of encoded values, a plurality of partial products which are binary numbers in twos-complement representation having different weights; and a partial product adder for summing up said plurality of partial products to calculate said product, wherein said partial product adder comprises:

a carry save adder having a plurality of inputs and at least one output for performing carry save addition with respect to said plurality of partial products; and a logic circuit for providing, in a plurality of digit positions higher than a sign digit of the partial product having the smallest value (first partial product) of said plurality of partial products, values resulting from a plurality of logic operations between a value of the sign digit of said first partial product and a value of a sign digit of another partial product to implement sign extension of said first partial product and a specified one of said plurality of inputs of said carry save adder presents propagation delay shorter than propagation delay of at least one other input between said output and itself and said first partial product after sign extension implemented by said logic circuit is allocated to said specified input.

7. A multiplier according to claim 6, wherein said first partial product after sign extension implemented by said logic circuit is allocated to the one of said plurality of inputs presenting the shortest propagation delay between said output and itself.

8. A multiplier according to claim 6, wherein said logic circuit has the function of determining respective values of digits of said first partial product extending from the one one digit higher than said sign digit to the one corresponding in position to a sign digit of the partial product having the largest weight (most significant partial product) of said plurality of partial products.

9. A multiplier according to claim 8, wherein said logic circuit has the function of:

providing the value of the sign digit of said first partial product in each of the digit positions of said first partial product extending from the one one digit higher than the sign digit of said first partial product to the one corresponding to the digit position one digit lower than a sign digit of the partial product having the second smallest weight (second partial product) of said plurality of partial products;

providing an exclusive OR value between the value of the sign digit of said first partial product and the value of the sign digit of said second partial product in the digit position of said first partial product corresponding to the sign digit of said second partial product; and providing an OR value between the value of the sign digit of said first partial product and the value of the sign digit of said second partial product in each of the digit positions of said first partial product extending from the one corresponding to the digit position one digit higher than the sign digit of said second partial product to the one corresponding to the sign digit of said most significant partial product.

10. A multiplier according to claim 8, wherein said logic circuit has the function of:

providing the value of the sign digit of said first partial product in each of the digit positions of said first partial product extending from the one one digit higher than the sign digit of said first partial product to the one corresponding to the digit position one digit lower than a sign digit of the partial product having the second smallest weight (second partial product) of said plurality of partial products;

providing an exclusive OR value between the value of the sign digit of said first partial product and the value of the sign digit of said second partial product in the digit position of said first partial product corresponding to the sign digit of said second partial product;

providing an OR value between the value of the sign digit of said first partial product and the value of the sign digit of said second partial product in each of the digit positions of said first partial product corresponding to the digit position one digit higher than the sign digit of said second partial product to the one corresponding to the digit position one digit lower than a sign digit of the partial product having the third smallest weight (third partial product) of said plurality of partial products;

providing an exclusive OR value between said OR value and the value of the sign digit of said third partial product in the digit position of said first partial product corresponding the sign digit of said third partial product; and providing an OR value between said OR value and the value of the sign digit of said third partial product in each of the digit positions of said first partial product extending from the one corresponding to the digit position one digit higher than the sign digit of said third partial product to the one corresponding to the sign digit of said most significant partial product.

* * * * *